(12) United States Patent
Lhuillier et al.

(10) Patent No.: US 8,688,324 B2
(45) Date of Patent: Apr. 1, 2014

(54) PUMP SYSTEM AND MOTORIZED VEHICLE

(75) Inventors: Xavier Lhuillier, Paulhac (FR); Mark Shaw, Casa Verde, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/510,011

(22) PCT Filed: Nov. 19, 2009

(86) PCT No.: PCT/IB2009/056015
§ 371 (c)(1),
(2), (4) Date: May 16, 2012

(87) PCT Pub. No.: WO2011/061574
PCT Pub. Date: May 26, 2011

(65) Prior Publication Data
US 2012/0232753 A1    Sep. 13, 2012

(51) Int. Cl.
*G06F 7/00*           (2006.01)
(52) U.S. Cl.
USPC ............................................ 701/36; 340/442
(58) Field of Classification Search
USPC ......... 701/36, 1; 340/442; 152/517, 450, 548, 152/429, 419, 21, 523, 210; 137/232, 231, 137/1, 226; 417/36; 425/47
See application file for complete search history.

(56) References Cited

U.S. PATENT DOCUMENTS

| | | | |
|---|---|---|---|
| 7,079,047 B2 | 7/2006 | Boulot | |
| 7,259,663 B2 * | 8/2007 | Ogawa | 340/442 |
| 7,706,930 B2 | 4/2010 | Cornoit | |
| 2003/0021330 A1 * | 1/2003 | Aubel et al. | 374/142 |
| 2005/0231344 A1 * | 10/2005 | Ogawa | 340/442 |
| 2008/0156406 A1 * | 7/2008 | Breed | 152/415 |

FOREIGN PATENT DOCUMENTS

| | | | | |
|---|---|---|---|---|
| FR | 2815711 A1 | 4/2002 | | |
| FR | 2863205 A1 | 6/2005 | | |
| GB | 2299380 A | 10/1996 | | |
| JP | 2004-322927 A | 11/2004 | | |
| JP | 2004322927 A | * 11/2004 | ............. | B60C 23/04 |
| JP | 2008-120275 A | 5/2008 | | |
| JP | 2008120275 A | * 5/2008 | | |
| JP | 2009-078788 A | 4/2009 | | |
| JP | 2009078788 A | * 4/2009 | | |
| WO | 2005-106422 A2 | 11/2005 | | |
| WO | 2009047765 A2 | 4/2009 | | |

OTHER PUBLICATIONS

International Search Report and Written Opinion correlating to PCT/IB2009/056015 dated Aug. 26, 2010.

* cited by examiner

*Primary Examiner* — Thomas Black
*Assistant Examiner* — Robert Payne

(57) ABSTRACT

A pump system for inflating a tire of a motorized vehicle, comprises a pump unit. The pump unit has an outlet connectable to an inlet of the tire, for providing a fluid to the inside of the tire. A communication interface is communicatively connectable to a tire pressure monitoring system, TPMS, in the vehicle, for receiving from the TPMS data representing information for controlling the providing of fluid to the tire. A pump controller is connected to the pump unit and to the communication interface and can control the pump unit based on at least the information.

20 Claims, 3 Drawing Sheets

PUMP SYSTEM AND MOTORIZED VEHICLE

FIELD OF THE INVENTION

This invention relates to a pump system and a motorized vehicle

BACKGROUND OF THE INVENTION

Pump systems for inflating tyre of motorized vehicles are known in the art. For example, British patent application publication GB 2 299 380 A1 discloses a vehicle compressor comprising an electronically operated compressor driven by a motor arranged to be connected to the vehicle's electrical supply, output supply means from the compressor for attachment to a vehicle tyre to inflate the tyre, pressure release valve means subject to the output pressure from the compressor comprising a moveable valve urged by resilient means against a valve seat, a housing defining an enclosure into which air from the pressure release valve releases; means for adjusting the pressure at which the release valve means release comprising a rotary knob mounted so as to be rotatably movable over a planar surface of the housing which carries a pressure—calibrated scale; and means for detecting the release of air into the enclosure and de-energising the motor.

With such an arrangement, the user can pre-set a desired inflating pressure by means of the rotary knob; the pressure can be readily set by aligning an appropriate part of the knob with the desired pressure on the calibrated scale. Once this desired pressure is reached, the device will automatically stop at this point.

However, a disadvantage is that this requires actions and knowledge from the user, since the user needs to needs to know the target value for the pressure, which is generally unknown and has to be looked up, for example on a look-up table provided on a vehicle, and set the desired pressure correctly.

SUMMARY OF THE INVENTION

The present invention provides a pump system and a motorized vehicle as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
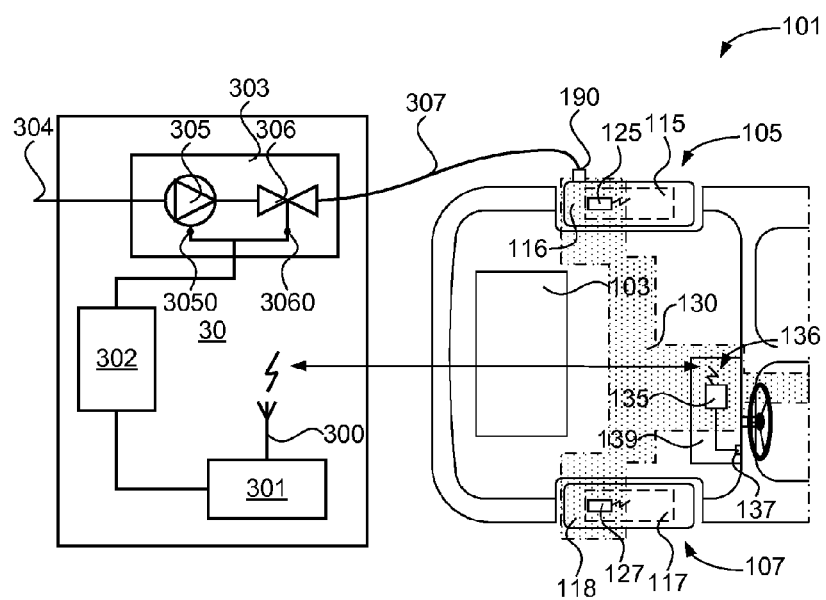
FIG. 1 schematically shows an example of an embodiment of a pump system and an example of an embodiment of a vehicle.

Referring to the example of FIG. 1, a pump system 30 for inflating a tyre of a motorized vehicle is shown therein, together with a part of a motorized vehicle 101.

The shown motorized vehicle 101 is an automobile, but the motorized vehicle may alternatively be a motorbike, an aeroplane undercarriage, straddle-lift carrier, forklift or another type of motorized vehicle. The vehicle 101 comprises a tyre pressure monitoring system (TPMS) 130 for monitoring a pressure of one, or more than one, tyre 105,107,109,111 of the vehicle 101 and outputting, in a for humans perceptible form, a warning when the pressure is outside a predetermine range. A Tire Pressure Monitoring System, sometimes referred to as a Tire Pressure Indication System (TPIS), is generally an in-vehicle electronic system which, when in operation, monitors the pressure inside the tires. The TPMS may for example be controlled to be in operation when the engine of the vehicle is running and to be inactive when the engine is not running. The TPMS provides information about the actual tire pressure, in a for humans perceptible form, to the driver of the vehicle, for example via a gauge, a pictogram display, or a low pressure indicator on the dashboard of the vehicle. The TPMS may for example be a direct TPMS, where the tyres comprise physical pressure sensors inside the tire and a data processing unit which processes and sends that information from the tire to a central controller system. Alternatively, the TPMS 130 may for example be a so called indirect TPMS, which does not use physical pressure sensors inside the tyres but measures parameters outside the tyre from which the pressure can be derived, such as the "apparent" air pressure, individual wheel rotational speeds, and other signals available outside the tire itself.

In the shown examples, and as explained below in more detail, the TPMS can comprise a tyre pressure monitoring module 135 and one, or more than one, tyre pressure sensor module 125,127,129,131. As shown, the tyre pressure monitoring module 135 is communicatively connected to the tyre pressure sensor modules 125,127,129,131. The tyre pressure sensor modules 125,127,129,131 are arranged to sense one, or more than one, parameter representative of a pressure in a respective tyre 105,107,109,111. In the shown example, the sensors are presumed to measure both the pressure and the temperature in the air-chamber of the tyre. The tyre pressure monitoring module 135 is arranged to determine whether or not the pressure in the tyre 105,107,109,111 is sufficient based on at least the sensed parameter.

As shown, the pump system 30 is an off-vehicle system, outside the vehicle 101. The pump system 30 may for example be a pump system in a residential garage or a repair shop, and for instance be stationary, e.g. be fixated to the ground. As shown in FIG. 1, the pump system 30 may comprise a communication interface 301, a pump controller 302, and a pump unit 303.

In the shown example, the pump unit 303 has an outlet 307 which is connectable to an inlet 190 of a fluid tight chamber of a tyre 105,107,109,111 of the motorized vehicle. The inlet 190 may for example comprise a tyre valve or a nozzle in order to allow fluid being inserted in the chamber, while preventing the fluid from flowing out of the chamber. When the outlet 307 is properly connected to the inlet 190 a fluid duct is formed between the pump unit 303 and the chamber, which allows the pump unit 303 to provide a fluid to the inside of the tyre and thereby inflate the tyre. Although further details are not shown in the example nor described herein below, it will be appreciated that the pump unit 303 may be implemented in any manner suitable for the specific implementation, and for example comprise a valve at the outlet 307 and an actuator, such as an electronic or manual actuator, which can actuate the valve to open and close the outlet, as well as other mechanical or electrical components which are commonly used in tyre inflators.

As shown in FIG. 1, the communication interface 301 of the pump system 30 may be communicatively connectable to a tyre pressure monitoring system (TPMS) 130 in the vehicle. In the shown example, a wireless connection can be established between the communication interface 301 and the TPMS via an antenna 300 in the pump system 30. In FIG. 1, as explained in more detail with reference to FIGS. 4-6, the TPMS 130 comprises a communication interface 136 communicatively connectable to the pump system 30, via which data representing information for controlling the provision of fluid to the pump system 30 can be transmitted. The communication interfaces 136, 301 may for example allow a two-way communication between the pump system 30 and the TMPS 130. The communication interface 301 can, when communicatively connected to the TPMS 130, for example transmit a request to the TPMS for data and receive from the TPMS the data.

Alternatively. the communication interfaces 136, 301 may for example allow a one-way communication between the pump system 30 and the TMPS 130. For example, the communication 301 can, when communicatively connected to the TPMS 130, for example transmit a request to the TPMS to put the TPMS in inflating mode during which the TPMS outputs information about the pressure and/or the inflating in a for humans perceptible form, for example by outputting respective sounds indicating that the inflating may be started, that the pressure is too high or too low. However, the TMPS may switch into inflating mode in response to otherwise determining an availability of a pump system. In the example of FIG. 1, the communication interface 301 is shown connected to a tyre pressure monitoring module 135 of the TPMS 130 and can receive data generated by the tyre pressure monitoring module 135, such as start/stop instructions or other information derived by the tyre pressure monitoring module 135 from the sensor data, e.g. without being connected to the sensor modules. Accordingly, the pump unit 30 may use the intelligence present in the tyre pressure monitoring module 135, without requiring extensive data processing capabilities.

Figure 2:
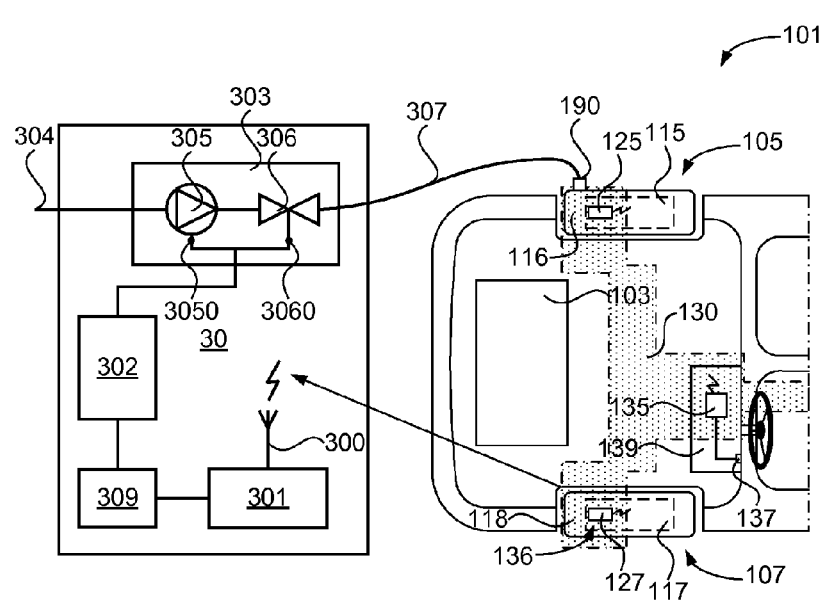
FIG. 2 schematically shows another example of an embodiment of a pump system and an example of an embodiment of a vehicle.

However, as shown in FIG. 2, the communication interface 301 may alternatively or in addition be communicatively connectable to the tyre pressure sensor module 125,127,129, 131 of the TPMS 130, and receive data generated by the sensor modules, e.g. without being connected to the tyre pressure monitoring module 135. Thereby, for example, calculations specific for a pump unit may be performed using the sensed parameter(s) and, as shown, the pump unit 30 may comprise a suitably configured data processor 309, e.g. connected to the interface 301 and the controller 302 to perform the calculations and to send instructions to the controller 302 which are based on the performed calculations.

The information may be any type of information suitable to control inflating the tyre to a desired pressure. The information may for example be information about a desired pressure of the tyre, and/or a pressure of the tyre (or another parameter related to the pressure, such as the temperature) observed by the TPMS 130 or simply an indication that the pump system 30 has to start or stop inflating the tyre. Thus, the pump system 30 may be relatively user friendly since it can be implemented such that less actions or knowledge may be required from the user to operate. For example, the system can be implemented such that the user does not need to memorise, look or set the desired pressure. Also, when the pump system receives from the TPMS 130 start and stop commands generated by the TPMS 130 based a comparison between the pressure observed in the tyre and a predetermined target value for the pressure, the system can be implemented such that the pump system can inflate the tyre to the desired pressure without requiring input from the user (after the user has connected the outlet 307 to the inlet 190 of the tyre).

In addition, the tyre can be inflated to a more suitable pressure, for example by setting the target pressure depending on the actual conditions in the tyre or the motorized vehicle. For example, the target value for the pressure may be determined by adjusting a predetermine theoretical target value for the temperature inside the tyre and/or the load bearing on the vehicle, as is explained below in more detail with reference to FIG. 6.

The pump controller 302 may, as in the shown example, be connected to the pump unit 303 and to the communication interface 301. The pump controller 302, when in operation, controls the pump unit based on at least the information, as is explained below in more detail with reference to the example of FIG. 3. The pump controller 302 may use additional information as well, such as for example information provided by one or more sensor 308 in the pump system 30, e.g. which detects the presence of the connection, or provided by a user of the pump system.

The pump controller 302 may control the operation of the pump unit 303 in any manner suitable for the specific implementation. For example, the pump controller 302 may, when in operation, control the pump unit 303 to start providing the fluid in response to the communication interface 301 receiving a start instruction, and stop providing the fluid in response to the communication interface 301 receiving a stop instruction. For instance, in the example of FIG. 1, the pump unit 303 comprises a compressor 305 and a valve 306 and the pump controller 302 may be connected to respective control inputs 3050,3060 of the compressor 305 and the valve 306, via which the operation of the compressor 305 and the valve 306 can be controlled. In the shown example, the compressor 305 is connected to an fluid intake 303 upstream of the compressor 305 in order to receive a fluid to be compressed, e.g. air, and is connected to the outlet 307 downstream of the compressor 305, in order to provide a compressed fluid, e.g. compressed air. The valve 306 is positioned between the compressor 305 and the outlet 307, and can open or close the flow path between the compressor 305 and the outlet 307.

The pump controller 302 may for example be arranged to open the valve 306 in response to receiving a start instruction and to close the valve 306 in response to a stop instruction. The pump controller 302 may start the compressor 305 in response to a detection of the connection between the outlet 307 and the inlet 190 and stop the compressor in response to detecting that the connection is broken. It will be apparent that the pump controller 302 may control the operation of the pump unit 303 in another manner.

Figure 3:
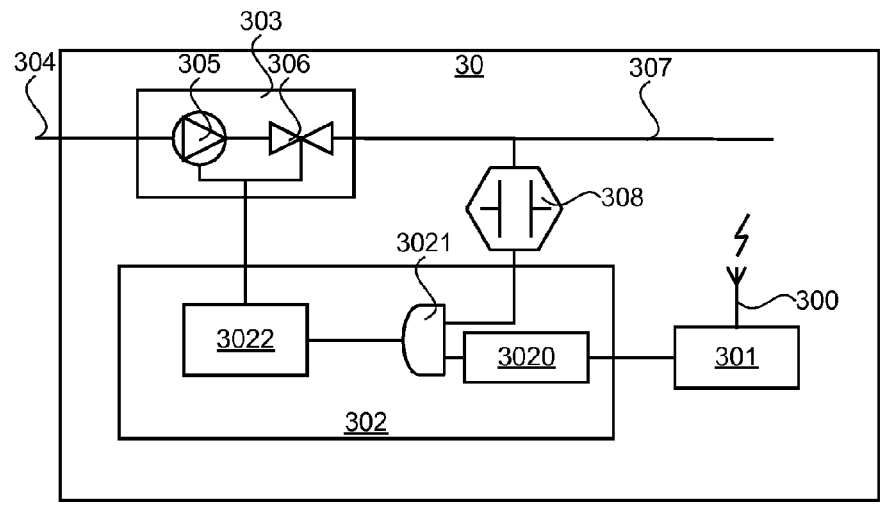
FIG. 3 shows a more detailed block diagram of the example of a pump system of FIG. 1.

Referring to the example of FIG. 3, the pump system 30 may comprise a detector 308 for detecting whether or not a coupling between the outlet 307 of the pump unit 303 and the inlet 190 of the tyre 105,107,109,111 is established. The detector 308 may for example be a button or other manual input which can be used by a user to indicate that the user has established a connection. The detector may also be another type of detector, which can detect the coupling without human interference. Suitable detectors are known in the art and for the sake of brevity not described in further detail. As shown in FIG. 3, the detector 308 may sense a parameter of the outlet 307, such as the instantaneous pressure or the change of the pressure over time. The shown pump controller 302 comprises an AND gate 3021 connected with an input to the detector 308. The AND gate is further connected with another input to the communication interface 301, and more specific the AND gate is connected with the other input to the output of a logic unit 3020 which is connected with an input to the communication interface 301.

The detector 308 asserts the output when a coupling is detected and negates the output otherwise. In the shown examples, in response to the detection, the logic unit 3020 may output, via the communication interface 301 an information request to the TPMS 130. Alternatively, the logic unit 3020 may transmit the information request to the TPMS in response to an activation signal, such as manually generated by a user, e.g. by pushing a button, or automatically generated when a vehicle comes within a perimeter around the pump system.

In response to the information request the TPMS 130 determines whether inflating can be started and, if so, transmits to the pump system 30 the information or another start instruction which indicates to the pump system 30 that inflating can be started.

The logic unit 3020 asserts the output thereof in response to receiving a start instruction from the TPMS via the communication interface and negates the output in response to receiving a stop instruction from the TPMS or when no communication with a TMPS is present. The AND gate asserts the output of the AND gate when both the inputs are asserted, i.e. in this example when both the detector 308 and the logic unit 3020 assert their respective output, and negates the output of the AND gate otherwise. Thus, when both a coupling is detected and a start instruction is received from the TPMS, the AND gate asserts its output.

As shown in FIG. 3, the AND gate 3021 is connected to a driver unit 3022 which outputs suitable control signals to the pump unit 305 and the valve 306, in order to have the pump unit 305 in operating mode and the valve open when the AND gate asserts its output, while having the valve closed, and optionally the pump unit 305 in non-operating mode, when the AND gate negates its output.

In addition or alternatively to using the information provided by the detector 308 as an input for controlling the operation of the pump controller, the pump controller 302 may output, via the communication interface 301, a pump available signal to the TPMS 130 in response to the detector detecting that the coupling is established.

In addition, the pump controller 302 may output other information to the TPMS 130, such as information required to establish a two-way communication connection between the TPMS 130 and the pump controller 302, such as receipt acknowledged message and status information about the pump unit 30. When the pump unit 30 is arranged to transmit information, the TPMS 130 can derive additional information therefrom, and for example determine that a tyre is flat if the pressure does not increase, e.g. with a certain rate or to a certain level, after the TPMS has been informed by the pump unit 30 that inflating the tyre has started. The additional information may for example be outputted to the user, such as for example via a gauge, a pictogram display, or a low pressure or flat tyre indicator on the dashboard of the vehicle.

Figure 4:
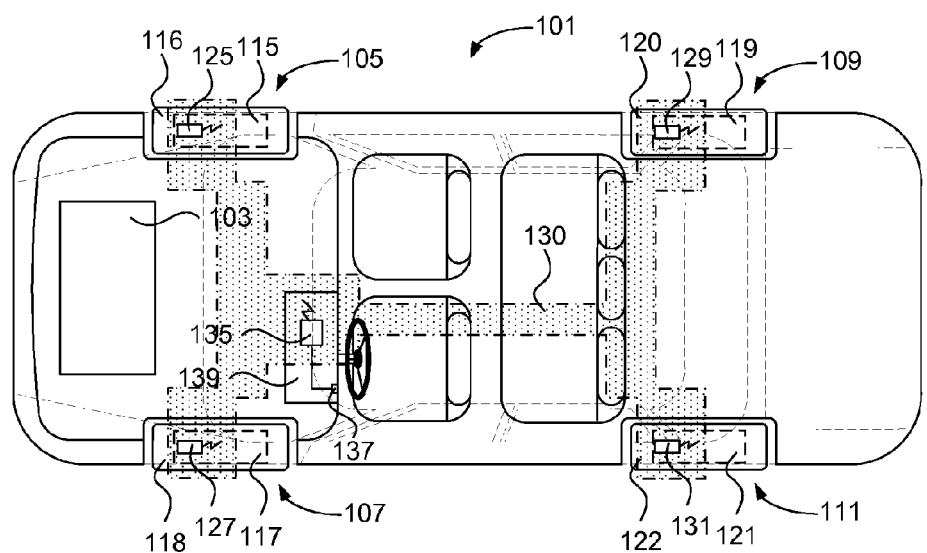
FIG. 4 shows a schematic top-view of an example of an embodiment of a motorized vehicle.

Referring to the example of FIG. 4, the example of a motorized vehicle 101 shown therein is a car with a motor 103, but may be one of another type of motorized vehicle e.g. trucks, semi trailers, SUVs, motorcycle, busses, electric vehicles, and airplanes in other embodiments.

Vehicle 101 is supported by four wheels 105, 107, 109, and 111. It will be apparent that the vehicle may have more or less wheels, e.g. when the vehicle is a motorbike there may be two or three wheels and if the vehicle is a truck more than four wheels may be present.

The wheel each comprise a rim 115, 117, 119, 121 on which a tire 116, 118, 120, 122 is mounted. Each wheel of vehicle 101 comprises a tire pressure sensor module 125, 127, 129, 131, which in the embodiment shown is mounted to a portion of the rim of the wheel that is exposed to the internal pressurized side of the tire. The TMPS may for example be implemented as described in International Patent application publication WO2005106422 A1, incorporated herein by reference.

The shown tire pressure sensor modules each comprise a pressure sensor for measuring the air pressure of the tire. The tire pressure sensor modules 125, 127, 129, 131 also comprise an antenna for transmitting the pressure information to a tyre pressure monitoring module 135, in this example implemented as a central controller system. In the shown example, the tyre pressure monitoring module 135 is mounted in instrument panel 139 of the vehicle 101. The tire pressure sensor module 125, 127, 129, 131 may comprise further (not shown) components, such as a temperature sensor for measuring the temperature of the tire. With such systems, the pressure readings may be compensated for temperature effects. With some systems, temperature may be measured at a slower interval than pressure.

Tyre pressure monitoring module 135 comprises an antenna and a receiver (not shown) via which communication with the tire pressure sensor module 125, 127, 129, 131 can be established. The tyre pressure monitoring module 135 evaluates the information, e.g. the sensed pressure and temperature, received from the tire pressure sensor modules 125, 127, 129, 131. If the tire pressure (temperature compensated in some embodiments) of any of wheels 105, 107, 109, 111, is below a certain threshold, tyre pressure monitoring module 135 activates an indication (e.g. dash board light 137) that the tire pressure is below the threshold.

Figure 5:
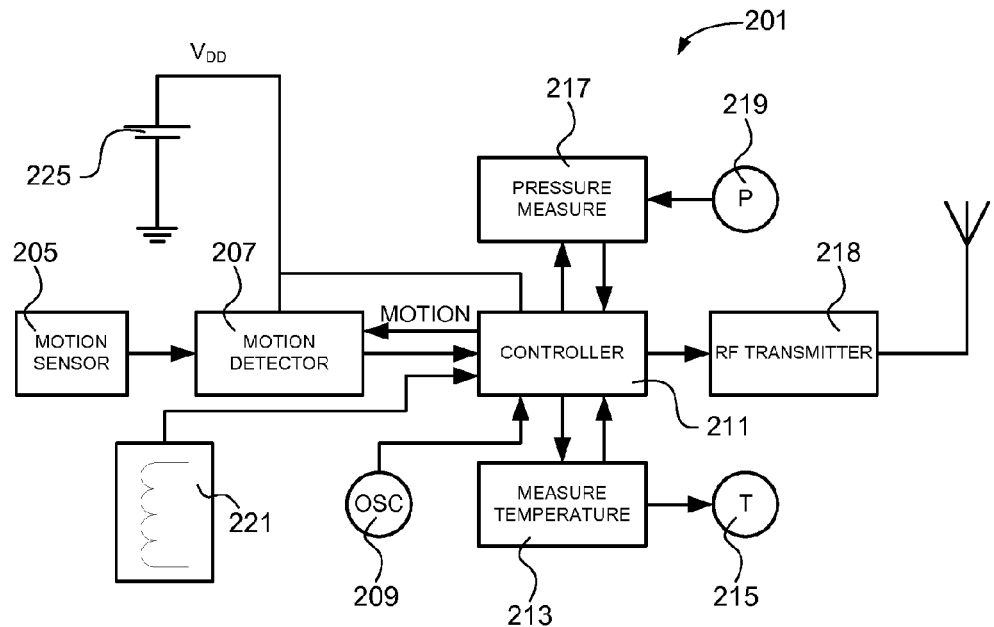
FIG. 5 shows a block diagram of a tyre pressure sensor module suitable for the example of FIG. 4.

FIG. 5 is a circuit diagram of an example of a tire pressure sensor module 201. The shown tire pressure sensor module comprises a motion sensor 205, a motion detector circuit 207, a pressure controller 211, an oscillator 209, a battery 225, a pressure sensor 219, a pressure measuring circuit 217, a temperature measuring circuit 213, a temperature sensor 215, an RF transmitter 218, and an antenna 221.

The pressure measuring circuit 217 provides, in response to a sample signal provided by the controller 211, a signal to controller 211 indicative of the pressure as measured by pressure sensor 219. Also, in response to a sample signal provided to temperature measuring circuit 213, temperature measuring circuit 213 provides a signal to controller 211 indicative of the temperature as measured by temperature sensor 215. In the embodiment shown, the output signals of pressure sensor 219 and temperature sensor 215 have voltage levels dependent upon the parameters being measured, which are converted by the measurement circuits 213, 217 in a digital value representing the measured parameter.

When in operation, the tire pressure sensor module 201 transmits via RF transmitter 218 and antenna 221 an indication of the tire pressure and tire temperature to a central controller system (e.g. tyre pressure monitoring module 135). In this example, the rate at which the indications of pressure and temperature are provided to controller 211 and transmitted to the central controller system are dependent upon what mode (e.g. motion or park) tire pressure sensor module 201 is operating. To determine whether tire pressure sensor module 201 should be in a motion mode and to transmit the indication or in a park mode, in which no transmission or at a lower rate takes place, tire pressure sensor module 201 comprises a motion sensor 205 for sensing vibration, angular acceleration or anyother physical disturbance caused by a wheel rotating over a surface. The motion detector circuit 207 uses the output of motion sensor 205 to provide a signal that is indicative of wheel rotation to the controller 211. Based on the signal provided by the motion detector circuit, the controller 211 determines and controls the mode the sensor module is in.

Figure 6:
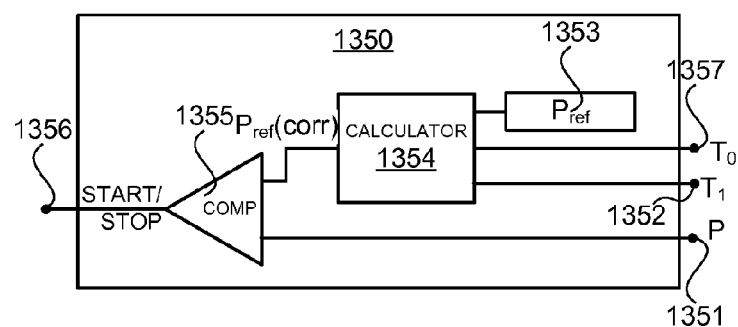
FIG. 6 shows a block diagram of a controller suitable for the example of FIG. 4.

The shown example comprises a coil 221 which forms part of the communication interface 136. Via the coil 221 the information request from the pump system 30 may be received, e.g. in the form of a low-frequency, LF, signal emitted by a suitable LF transmitter in the pump system 30. In response to the information request, the tire pressure sensor module 201 switches into inflating mode, in which the measurements are performed at a rate suitable to control the inflating of the tyre, A suitable rate is found to be at least several times per second, although other rates may be used as well. The inflating mode rate may be different from the rate during the normal modes of the TPMS, e.g. in this example the rate during the park mode and the motion mode, in which the rate may be once every 10-30 minutes or even lower, although other rates may be used as well. In the example of FIG. 2, the transmitted information may be received directly by the pump 30, in which a pressure controller, for instance as shown in FIG. 6, may then e.g. determine the target pressure using the requested information as well as information about the vehicle type or type of TPMS system, which may be obtained for example prior to sending the request. For example, the user may have been prompted to enter the vehicle type or type of TPMS system or the pump system may have performed a series of probing checks on the TPMS to determine the type.

Referring to FIG. 6, an example of a pressure controller 1350 for determining the desired value for the tyre pressure is shown therein. The pressure controller 1350 may for example be part of the tyre pressure monitoring module 135 or of another part of the motorized vehicle or the pump system. The pressure controller 1350 comprises a memory 1353, a calculator 1354 and a comparator 1355.

The pressure controller 1350 is arranged to determine said desired value based on at least said temperature and said predetermined theoretical target value. The shown example uses temperature and pressure, or parameters from which those can be derived for the determination, as may for example be provided by the example of FIG. 5. The shown example comprises a data input 1352 for receiving information about a current temperature $T_1$ in said tyre (105,107,109, 111). At a second input a predetermined theoretical target value $P_{ref}$ for the pressure may be received. In the shown example, the predetermined theoretical target value $P_{ref}$ is shown stored in a memory 1353 of the pressure controller 1350, alternatively the predetermined theoretical target value $P_{ref}$ may be received from outside the pressure controller 1350, and for example have been stored in a memory integrated in the tyre and sent to the controller 1350 by the sensor module of that tyre.

As shown, the calculator 1354, which may for example be a suitably programmed microprocessor or microcontroller, is connected to both the memory 1353 and the data input 1352 and can calculate the desired value based on the current temperature $T_1$ and the predetermined theoretical target value $P_{ref}$, for example by performing an operation as can be described by the mathematical formula:

$$P_{desired} = \frac{P_{ref} \cdot T_1}{T_{ref}} \qquad (1)$$

in which formula $P_{desired}$ represents the desired value, $T_{ref}$ represents a predetermined default temperature at which the theoretical target value $P_{ref}$ is determined (e.g. room temperature, 293 K).

More complex operations may be performed as well to determine a desired pressure. For instance the example of FIG. 6 has an input 1357 for receiving information about the ambient temperature $T_0$ of the tyre, The current temperature $T_1$ as measured may be corrected using the measured ambient temperature $T_0$ as a parameter to obtain a more accurate value for the desired pressure. For example, the temperature $T_1$ as measured may be corrected using the measured ambient temperature or the value for the desired pressure may be corrected to take the influence of the ambient temperature on the temperature of the gas in the tyre into account. For example, a method as described in U.S. Pat. No. 7,111,507, incorporated herein by reference, may be performed As shown in FIG. 6, the calculator 1354 may be connected with a calculator output to a comparator input of the comparator 1355. As shown, another input of the comparator 1355 may be connected to another data input 1351 of the pressure controller 1350, at which data representing the measured pressure P can be received. The comparator 1355 may compare the measured pressure P with the desired pressure $P_{desired}$ as determined by the calculator 1354. The comparator 1355 may output "a pressure too low" signal when the measured pressure P is below the desired pressure P desired and a "pressure sufficient" signal when the measured pressure P is equal to or above the desired pressure $P_{desired}$. The comparator 1355 may be of a more complex design, and for example compare the measured pressure P with multiple (corrected) threshold, such as to determine whether the measure pressure P is in a range between a lower pressure threshold $P_0$ and an upper pressure threshold $P_1$ and to output a warning signal when the pressure is outside the range, e.g. a too low signal when the pressure is below lower pressure threshold $P_0$ and a too high signal when the pressure is above the upper pressure threshold $P_1$.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals. For instance in the examples, the communication interface 301 is shown directly connected to the communication interface 135. However, the connection may also be established indirectly, for example by outputting by the communication interface 135 in a for human perceptible form control signals suitable to control the pump unit which may then be used by a user of the pump system to control the operation of the pump system. For example, the TPMS may output to the user signals indicating that the inflating may be started, that the pressure is too high or that the pressure is too low, in response to which the user may perform a suitable operation, e.g. starting the inflating, or reducing/increasing the pressure.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Each signal may also conform to one of numerous protocols comprised of specific patterns or signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in an example, the illustrated examples may be implemented as circuitry located on a single integrated circuit or within a same device. For example, the electronic components of the pump unit 30 shown in FIG. 1 may be implemented as an integrated circuit. Likewise, the sensor module 201 may be implemented as a single integrated circuit. Alternatively, the examples may be implemented as any number of separate integrated circuits or separate devices interconnected with each other in a suitable manner. For example, motion detector 207, the controller 211 and the measurement modules 213 217 may be separate integrated circuits connected in a manner suitable to form the sensor module 201.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one, or more than one. Also, the use of introductory phrases such as "one, or more than one," and "one or more" in the claims should not be construed to imply that the introduction of another claim element by the indefinite articles "a" or "an" limits any particular claim containing such introduced claim element to inventions containing only one such element, even when the same claim comprises the introductory phrases "one or more" or "one, or more than one," and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A pump system for inflating a tyre of a motorized vehicle, the pump system comprising:
   a pump unit having a fluid outlet configured to couple to a fluid inlet of said tyre, wherein the pump unit is configured to provide a fluid to the inside of said tyre;
   a communication interface communicatively connectable to a tyre pressure monitoring system (TPMS) in said vehicle, for receiving from said TPMS data representing information for controlling said providing of fluid to said tyre;
   a pump controller coupled to the pump unit and to the communication interface, wherein the pump controller is configured to control the pump unit based on at least said information; and
   a detector coupled to the pump controller, the detector configured to detect whether a coupling between the fluid outlet of the pump unit and the fluid inlet of said tyre is established,
   wherein the pump unit, the communication interface, the pump controller, and the detector of the pump system are external to the motorized vehicle.

2. The pump system as claimed in claim 1, wherein:
   said communication interface is communicatively connectable to a tyre pressure sensor module of said TPMS, said tyre pressure sensor module being arranged to sense at least one parameter representative of a pressure in said tyre; and the pump controller is arranged to control said pump unit based on at least data received from said tyre pressure sensor module.

3. The pump system as claimed in claim 1, wherein:
said communication interface is communicatively connectable to a tyre pressure monitoring module of said TPMS,
said tyre pressure monitoring module being communicatively connected to a tyre pressure sensor module arranged to sense at least one parameter representative of a pressure in said tyre, and
said tyre pressure monitoring module being arranged to determine whether said pressure in said tyre is sufficient based on at least said parameter.

4. The pump system as claimed in claim 1, wherein
said data comprises a start instruction and a stop instruction, and said pump controller, when in operation, controls the pump unit to:
start providing said fluid in response to said communication interface receiving said start instruction, and
stop providing said fluid in response to said communication interface receiving said stop instruction.

5. The pump system as claimed in claim 1, wherein
said pump controller is arranged to output, via said communication interface, a pump available signal to said TPMS in response to said detector detecting that said coupling is established.

6. The pump system as claimed in claim 1, wherein said pump controller is arranged to generate and output, via said communication interface, a request for said TPMS to provide said information.

7. A motorized vehicle configured to couple to the pump system of claim 1, the motorized vehicle comprising:
a tyre pressure monitoring system (TPMS) configured to monitor a pressure of at least one tyre of said motorized vehicle, and
output in a for humans perceptible form a warning when said pressure is outside a predetermine range, wherein
said TPMS comprises a communication interface configured to communicatively connect to the pump system for transmitting to said pump system data representing information for controlling said providing said fluid.

8. The motorized vehicle as claimed in claim 7, wherein said TPMS further comprises:
a tyre pressure sensor module for sensing at least one parameter representative of a pressure in said tyre; and
wherein said communication interface is coupled to said tyre pressure sensor module and arranged to output to said pump system data representing information about said sensed parameter.

9. The motorized vehicle as claimed in claim 7, wherein said TPMS comprises:
a tyre pressure sensor module arranged to sense at least one parameter representative of a pressure in said tyre;
a tyre pressure monitoring module being communicatively connected to said tyre pressure sensor module, said tyre pressure monitoring module being arranged to determine whether or pressure in said tyre is sufficient based on at least said parameter; and
wherein said communication interface is communicatively connectable to said tyre pressure monitoring module, for outputting to said pump system data generated by said tyre pressure monitoring module.

10. The motorized vehicle as claimed in claim 7 further comprising:

a pump control unit, coupled to said communication interface, configured to initialize and stop a provision of a fluid to the inside of said tyre by said pump system, and wherein
said communication interface is arranged to transmit a start instruction to said pump controller in response to said pump control unit initializing said provision and to transmit a stop instruction in response to said pump control unit stopping said provision.

11. The motorized vehicle as claimed in claim 7, wherein said TPMS has at least one normal mode in which measurements of said parameter are performed at a normal rate and an inflating mode in which said measurements are performed at an inflating rate higher than said normal rate and wherein said TPMS is arranged to switch into said inflating mode in response to determining an availability of said pump system.

12. The pump system claimed in claim 1, comprising a pressure controller for determining a desired value of a pressure in said tyre.

13. The pump system as claimed in claim 12, wherein said pressure controller comprises:
a first input for receiving information about a temperature in said tyre;
a second input for receiving a predetermined theoretical target value, wherein
the pressure controller is arranged to determine said desired value based on at least said temperature and said predetermined theoretical target value.

14. A pump system as claimed in claim 13, wherein said pressure controller further comprises:
a third input for receiving information about an ambient temperature of said tyre, wherein the pressure controller is arranged to determine said desired value based on at least said temperature in said tyre, said ambient temperature and said predetermined theoretical target value.

15. The motorized vehicle claimed in 7, comprising a pressure controller for determining a desired value of a pressure in said tyre.

16. The motorized vehicle as claimed in claim 15, wherein said pressure controller comprises:
a first input for receiving information about a temperature in said tyre;
a second input for receiving a predetermined theoretical target value, wherein
the pressure controller is arranged to determine said desired value based on at least said temperature and said predetermined theoretical target value.

17. The motorized vehicle as claimed in claim 16, wherein said pressure controller further comprises:
a third input for receiving information about an ambient temperature of said tyre, wherein the pressure controller is arranged to determine said desired value based on at least said temperature in said tyre, said ambient temperature and said predetermined theoretical target value.

18. A system comprising:
a pump system external to a vehicle, the pump system including:
a pump communication interface;
a fluid outlet; and
a detector; and
the vehicle including:
a tyre pressure monitoring system (TPMS) configured to monitor a pressure of at least one tyre of said vehicle and comprising a vehicle communication interface, wherein the vehicle communication interface is configured to transmit data to the pump communication interface of the pump system, wherein the data includes information for controlling the pump system to provide a fluid to the at least one tyre of the vehicle; and a fluid inlet of the at least one tyre of said vehicle, the fluid inlet configured to be coupled to the fluid outlet of the pump system, the detector of the pump system configured to detect whether a coupling between the fluid outlet of the pump system and the fluid inlet of the at least one tyre of the vehicle is established.

19. The system as claimed in claim 18, wherein said TPMS further comprises:

a tyre pressure sensor module for sensing at least one parameter representative of a pressure in said tyre, wherein said vehicle communication interface is coupled to said tyre pressure sensor module, and said data represents information about said sensed parameter.

20. A pump system for inflating a tyre of a motorized vehicle, the pump system comprising:

a pump unit having a fluid outlet configured to couple to a fluid inlet of said tyre, wherein the pump unit is configured to provide a fluid to the inside of said tyre;

a communication interface communicatively connectable to a tyre pressure monitoring system (TPMS) in said vehicle, for receiving from said TPMS data representing information for controlling said providing of fluid to said tyre;

a pump controller coupled to the pump unit and to the communication interface, wherein the pump controller is configured to control the pump unit based on at least said information; and a detector coupled to the pump controller, the detector configured to detect whether a coupling between the fluid outlet of the pump unit and the fluid inlet of said tyre is established.

* * * * *